W. P. GOFF.
Portable Fence.

No. 88,469. Patented Mar. 30, 1869.

Witnesses:

Inventor:

WILLIAM P. GOFF, OF YORKVILLE, WISCONSIN.

Letters Patent No. 88,469, dated March 30, 1869.

IMPROVEMENT IN PORTABLE FENCE.

The Schedule referred to in these Letters Patent and making part of the same.

*To all whom it may concern:*

Be it known that I, WILLIAM P. GOFF, of Yorkville, county of Racine, and State of Wisconsin, have invented a new and useful Improvement in Portable Fences; and I do hereby declare that the following is a full, clear, and exact description thereof, which will enable those skilled in the art to make and use the same, reference being had to the accompanying drawing, forming part of this specification, in which—

Figure 1:
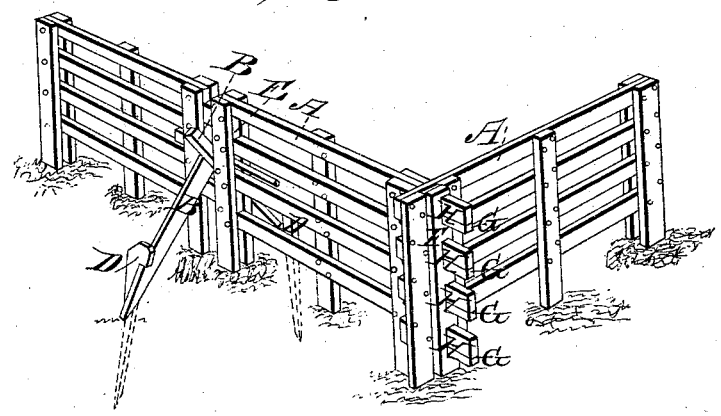
Figure 3:
Figure 2:
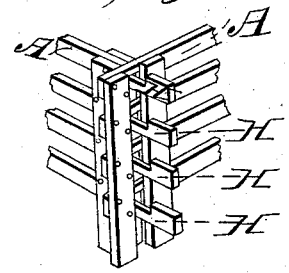
Figure 4:

Figure 1 is a perspective view of my invention;
Figure 2 is a sectional view of the corner;
Figure 3 is a view of the binding-clasp; and
Figure 4, a view of one of the wedges.

Similar letters of reference in each of the figures indicate corresponding parts.

The object of my invention is to produce a portable fence, easily built, and easily removed from place to place.

A is the fence, made of boards.

B B, two braces at the fence-joints, with holes through their upper ends.

C, a round pin, passing through braces B, and between the fence-panels.

D, stakes, with notches in their top ends, and driven into the ground, so that the notches shall hook over notches in braces B.

E E, stays, passing through, from length of fence to length of fence, between the panels, to hold the fence stiff in position.

F, binding-clasp.

G, wedges, to hold the fence together.

H, notched ends of the panels, for clasp F to fit into.

These panels are notched wide enough for the purpose. The other panels are notched just wide enough, and half way up the panel, to make a close fit.

The bottom of the posts and the lower end of the braces and stakes are dipped in coal-tar, so as to preserve them.

Operation.

Put the fence together in lengths, as described. Then put the corner together, as shown in fig. 2. Then put clasp F in place, and drive the wedges G, and it is locked together. Then bring the ends of another length up to the end of one of the lengths; put the stays E in place, and put the braces B in their place, and put the round pin, C, through the fence, and the holes in braces B, and drive stake D into the ground, and the work is done.

Dip the ends of the posts in coal-tar, to preserve them.

What I claim as my invention, and desire to secure by Letters Patent, is—

1. Panels A, braces B, pin C, stakes D, and stays E, constructed and arranged substantially as described.

2. Panels A, clasp F, wedges G, and notched ends H of the panels, for turning a corner, substantially as described.

WM. P. GOFF.

Witnesses:
J. B. SMITH,
H. LUDINGTON.